United States Patent [19]

Hatch et al.

[11] 4,436,315

[45] Mar. 13, 1984

[54] TWO PIECE SEAL ADAPTED FOR SIMPLIFIED INSTALLATION

[75] Inventors: Seymour A. Hatch, Bensenville; James P. Morley, Arlington Heights, both of Ill.

[73] Assignee: CR Industries, Elgin, Ill.

[21] Appl. No.: 311,148

[22] Filed: Oct. 13, 1981

[51] Int. Cl.³ ............................................. F16J 15/34
[52] U.S. Cl. ...................................................... 277/92
[58] Field of Search ........................ 277/83, 84, 92, 93

[56] References Cited

U.S. PATENT DOCUMENTS

| | | | |
|---|---|---|---|
| 3,272,519 | 9/1966 | Voitik | 277/92 |
| 3,826,506 | 7/1974 | Eckert | 277/92 |
| 4,090,516 | 6/1978 | Morley et al. | 277/92 |

Primary Examiner—Robert I. Smith
Attorney, Agent, or Firm—James T. FitzGibbon

[57] ABSTRACT

A seal assembly for reception in a tapered counterbore which seal assembly includes a primary metal sealing ring with a seal band disposed on one end face thereof, and which further includes a frusto-conical or other tapered center portion and an opposite end portion which is contoured to receive and hold a secondary sealing ring, and a secondary sealing ring of annular configuration and having a generally central portion including, in its unstressed condition, a body with a cental body portion of generally circular cross section and including means lying outside the central body portion and adapted to engage the counterbore and/or the opposite end portion of the primary seal ring for positive location of the secondary seal ring during installation, with the counterbore or opposite end portion engaging means being positioned so as to move out of engagement with said tapered center portion and said counterbore respectively, so that said counterbore and tapered center portion, respectively, engage the round surface portions of said sealing rings central body portion when said primary and secondary sealings rings are in position of use within said counterbore and under a sealing load.

9 Claims, 18 Drawing Figures

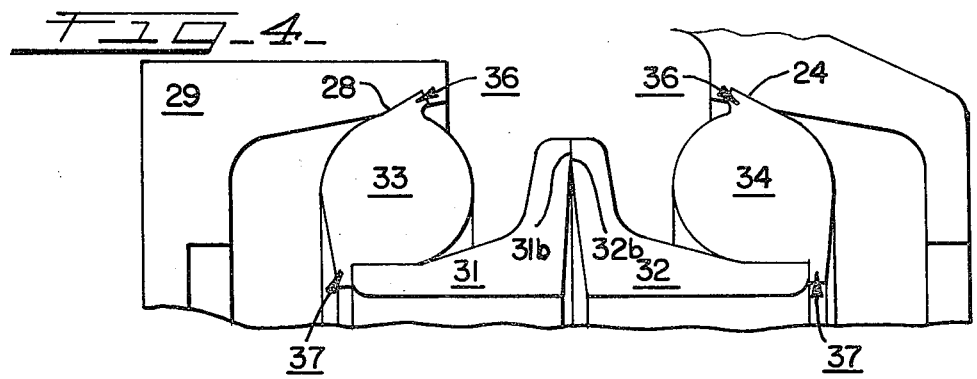
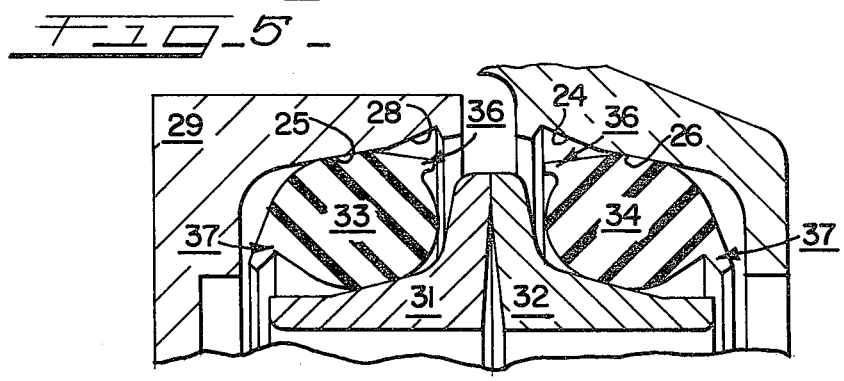
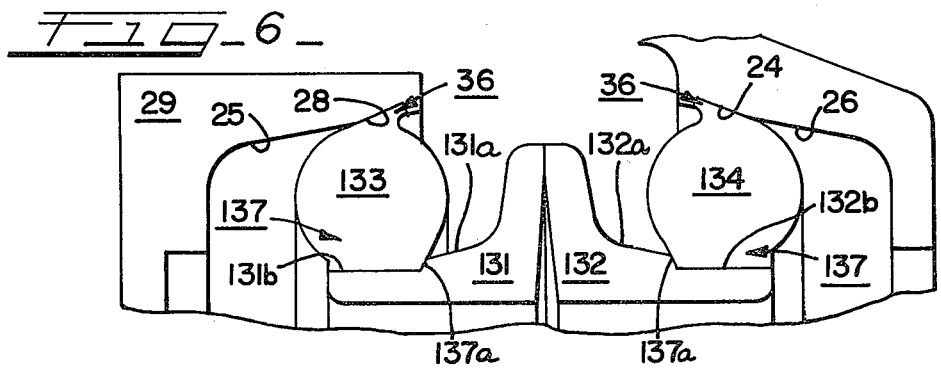
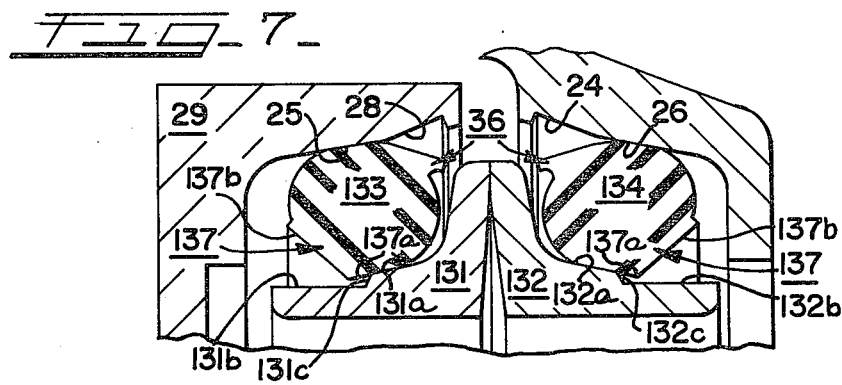

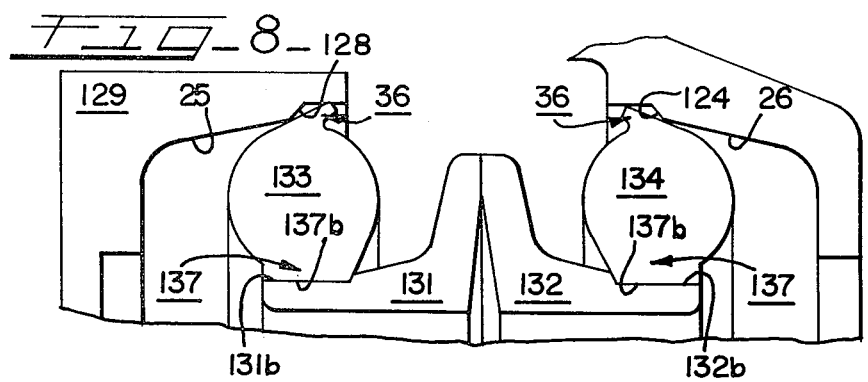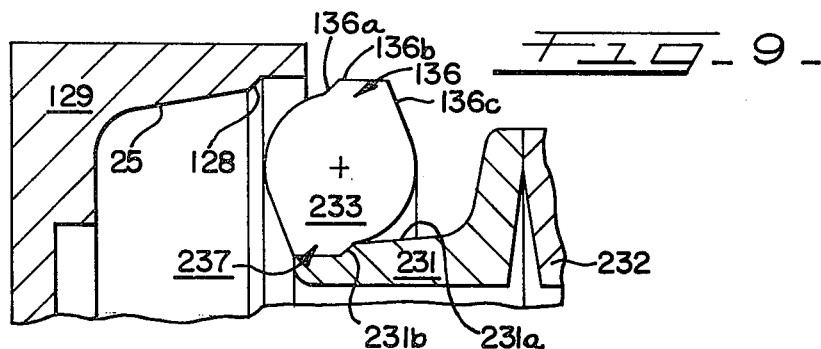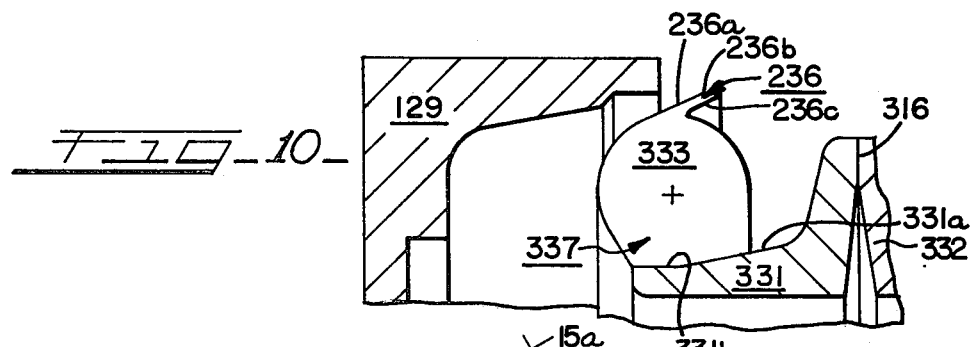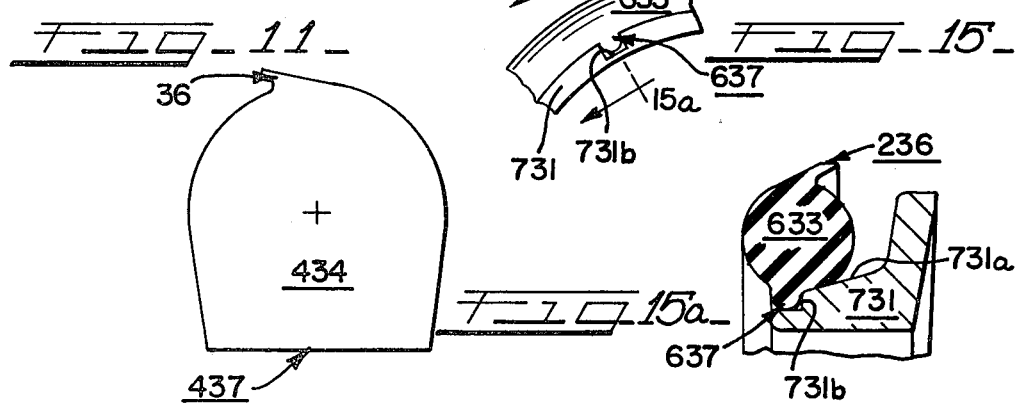

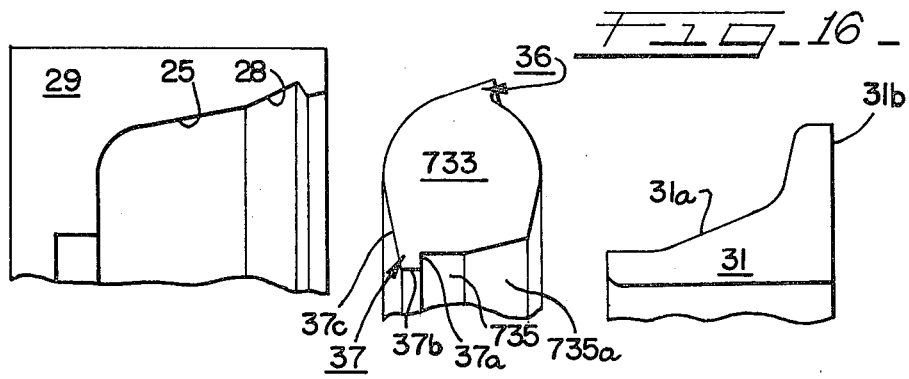
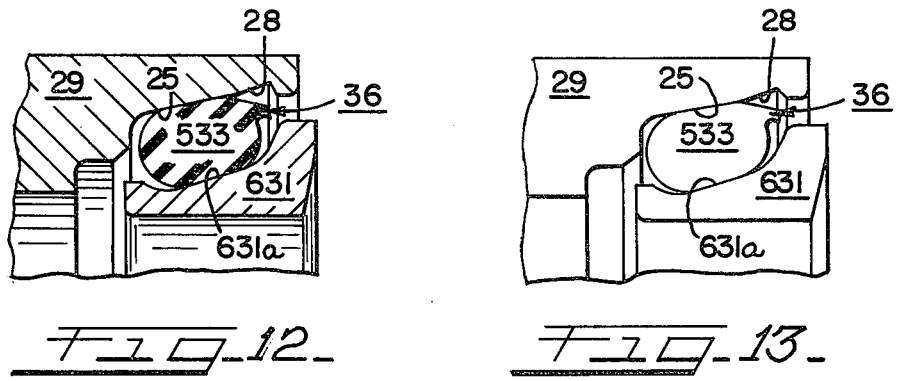
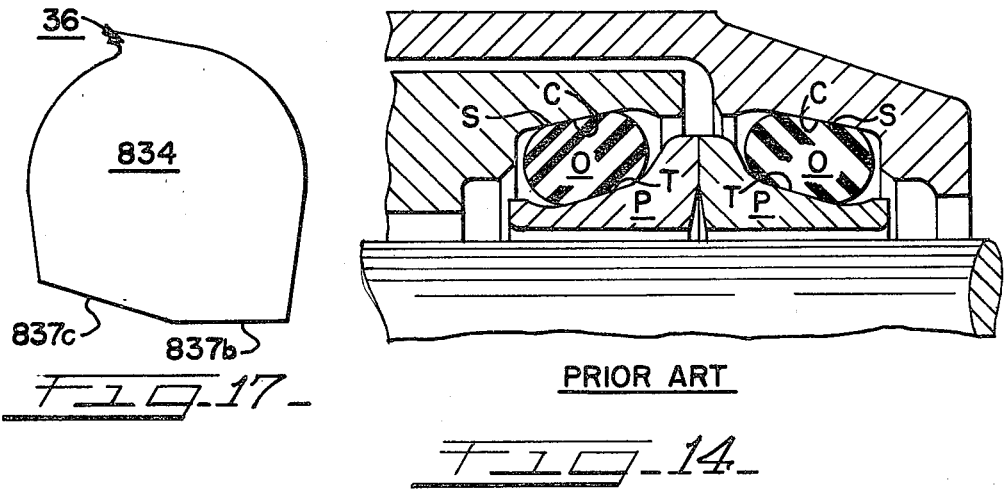

TWO PIECE SEAL ADAPTED FOR SIMPLIFIED INSTALLATION

The present invention relates generally to seal units and in particular to so-called mechanical seals of the end face type used to retain oil in a sealed region and exclude dirt and grit therefrom. The preferred form of such seals are characterized by including constructional features which adapt the seals for easy and reliable installation.

Mechanical end face seals have proven extremely satisfactory in many environments, particularly those involving machinery which is subjected to heavy duty use under severe conditions over an extended period of time.

For example, military vehicles such as tanks and armored personnel carriers, tunneling and mining equipment, wet disk brakes, earthmoving equipment such as crawler tractors, motorized scrapers, cranes, power shovels, and other crawler mounted equipment have used mechanical end face seals for many years. These seals, in some cases, are used in the track pins of such vehicles, and in almost all cases, in the final drive assemblies and in the track rollers of such vehicles, as well as in other applications, such as accessory drives and components.

Many end face seals have attained such a high degree of reliability that, in use, they will have an anticipated life which is equal to that of the sealed parts and are hence referred to as "lifetime" seals.

Lifetime seals which have been successful in practice have basically been subdivided into two types, one being illustrated, for example, in U.S. Pat. No. 3,241,843, and the other type in U.S. Pat. No. 3,180,648. This type of seal is sometimes known as a "toric O-ring seal" because, in operation, an O-ring is flattened as it rolls between opposed complementary frusto-conical surfaces.

Virtually all successful seals of the lifetime type are of a simplified construction requiring only two different pieces, a metal primary seal ring and a rubber secondary seal or load ring. In many cases, these two seal parts are matched in mirror image pairs, and the entire seal includes four parts, two identical rubber rings and two identical metal rings, with the end faces of the metal rings being urged into sealed relation by the rubber rings.

Whereas seals of the type shown in U.S. Pat. No. 3,241,843 and the like are extremely easy and reliable to install, there is still a significant demand for original equipment and replacement toric O-ring seals. While both seals perform very satisfactorily in use, one chronic drawback of toric O-ring seals is that, because the counterbore includes an annular lip of reduced diameter in relation to the ramp upon which the O-ring rides in use, installation is difficult. In most, if not all, cases, initial positioning of the seal in the seal counterbore is achieved by using a special tool which attempts to insure that the O-ring will be inserted into the counterbore over the restriction provided by the reduced diameter opening, and will thereafter be positioned satisfactorily. In these seals, the cone or ramp type metal ring also has a lip relative to which the O-ring should be accurately positioned.

Because end face seals of the type referred to, especially when made in a lifetime configuration, often are made with expensive metal alloys which have unparalleled wear resistance, the metal portions of the seals are very expensive, and extremely hard and durable but are subject to scratching and chipping in use. Accordingly, installation of such seals must be carried out with great care because, in some applications, the smaller seals may cost as much as $5.00 to $10.00, and in the case of large seals, perhaps up to $100.00 or even several hundred dollars or more.

Furthermore, because of their extended lives, the seals are often placed in very inaccessible locations. Hence, installation is very critical in the sense that, if done improperly, there can be early seal leakage. In such a case, the entire mechanism must be disassembled and the seal reinstalled at a far greater expense than the cost of the defective part.

Installation of toric O-ring seals has created such a problem that, in some cases, they are simply not specified, even though other considerations would indicate that they should be used. With the recent increase in very large diameter sealed mechanisms, such as the multiple disc type, so-called "wet brake", that is, multiple disc brakes running in an oil bath, there has been a further increased need for seals of the mechanical end face type which have a very large diameter and which are consequently extremely expensive. Generally, the larger the seal, the more difficult it is to install, and accordingly, it is very important that the seal be installed in its intended application in a reliable manner.

Until the present time, however, this problem has been attacked, in the case of toric ring type seals, by using more and more elaborate installation tools and taking painstaking care, with the result that installation labor was extremely expensive. Even so, many seals disassembled for maintenance or inspection are found to have the O-rings "snaked" or unevenly distributed in a serpentine manner.

In view of the shortcomings of the prior art, it is therefore an object of the present invention to provide an improved, heavy duty end face seal.

Another object of the invention is to provide heavy duty end face seals which have the advantages of prior art cone or O-ring type heavy duty end face seals but which are adapted to be installed with great simplicity.

A still further object of the invention is to provide a seal design for easier installation which does not sacrifice either ease or reliability of installation, and which is also easy and reliable to manufacture.

An even further object of the invention is to provide a seal unit having a specially designed counterbore and complimentary O-ring which, while specially designed for ease of installation, are easy to manufacture in relation to prior art counterparts.

Yet a further object of the invention is to provide a seal unit which can take advantage of existing technology and which may be designed so as to perform in a known manner, but in which the additional features provided serve to improve the installation, so that customer redesign or respecification is not needed as a precondition to adopting such improved seal.

Yet another object of the invention is to provide a seal in which the O-ring portion is of specially designed configuration having an annular retention lip formed thereon for cooperation with an installation groove in a counterbore in which the seal assembly will be located in use.

A still further object of the invention is to provide a seal construction which makes it possible to manufacture certain of the seal components by simplified manufacturing techiniques, particularly those involved in casting the primary seal ring units.

Another object of the invention is to provide a secondary seal ring unit which, in use, has a centroid portion which substantially axially overlaps an end portion of the primary seal ring with which it is associated during installation.

A further object of the invention is to provide a seal which includes a counterbore of a generally frusto-conical configuration, free from an outer annular rim of reduced diameter, and which includes, spaced axially inwardly from the outer edge thereof, a groove adapted to receive a portion of the modified O-ring forming a component of the novel seal of the invention.

A still further object of the invention is to provide a seal assembly in which a counterbore groove includes leveled or tapered surfaces which act as a hook or support element to position and retain a rubber ring, and which in turn is adapted to receive and support the primary seal ring.

Yet another object is to provide a secondary sealing ring adaptable for use in a toric O-ring seal application, which seal ring is of annular configuration, and which has a pair of opposed sidewalls of circular configuration and at least one end wall having contoured means thereon for engaging a shoulder portion of an associated primary seal ring for the purpose of facilitating initial positioning and installation of the seal parts within the sealed mechanism.

The foregoing and other objects and advantages of the invention are achieved in practice by providing a seal assembly for reception in a tapered counterbore which seal assembly includes a primary metal sealing ring with a seal band disposed on one end face thereof, and which further includes a frusto-conical or other tapered center portion and an opposite end portion which is contoured to receive and hold a secondary sealing ring, and a secondary sealing ring of annular configuration and having a generally central portion including, in its unstressed condition, a body with a central body portion of circular cross section and including means lying outside the central body portion and adapted to engage the counterbore and/or the opposite end portion of the primary seal ring for positive location of the secondary seal ring during installation, with the counterbore or opposite end portion engaging means being positioned so as to move out of engagement with said tapered center portion and said counterbore respectively, so that said counterbore and tapered center portion respectively, engage the round surface portions of said sealing ring central body portion when said primary and secondary sealing rings are in position of use with said counterbore and under a sealing load.

BRIEF DESCRIPTION OF THE DRAWINGS

FIG. 4 is a view similar to that of FIGS. 2 and 3, showing the seal unit of the invention in its fully assembled position just as installation is beginning;

FIG. 5 is a view similar to FIGS. 2-4 and showing the seal in its assembled position of use and being acted upon by a typical sealing load;

FIG. 6 is a vertical sectional view of a modified form of seal unit according to the invention, showing the parts in an assembled but unloaded relation;

FIG. 7 is a view of the seal unit of FIG. 6 showing it in a position of use and being acted upon by a typical sealing load;

FIG. 8 is a vertical sectional view of a further modified form of an assembled seal unit made according to the invention;

FIG. 9 is a partially exploded view of a still further form of seal made according to the invention;

FIG. 10 is a partially exploded view of a still further form of seal made according to the invention;

FIG. 11 is a vertical sectional view, on an enlarged scale of the cross section of another form of modified toric O-ring useful with seals of the invention;

FIG. 12 is a vertical sectional view of a still further modified form of seal made according to the invention;

FIG. 13 is a view similar to that of FIG. 12, without cross hatching;

FIG. 14 is a vertical sectional view of a seal assembly made according to the prior art;

FIG. 5 is a fragmentary end elevational view showing a still further modified form of a seal of the invention;

FIG. 15A is a vertical sectional view of the seal of FIG. 15, taken along lines 15a—15a thereof;

FIG. 16 is a fragmentary exploded cross sectional view of three principal components of another form of seal made according to the present invention; and FIG. 17 is a modified cross sectional view of a further modified form of secondary seal ring made according to the invention.

DESCRIPTION OF THE PREFERRED EMBODIMENTS OF THE INVENTION

While the seals of the invention are used in a number of applications, and may assume different positions of use, the invention is illustrated with respect to an installation wherein the shaft or other sealed mechanism extends horizontally. Expressions "axial", "radial", etc. refer to the sealed elements in any positions thereof, and are used herein for convenience of illustration and not as any limitation of the invention.

Figure 1:
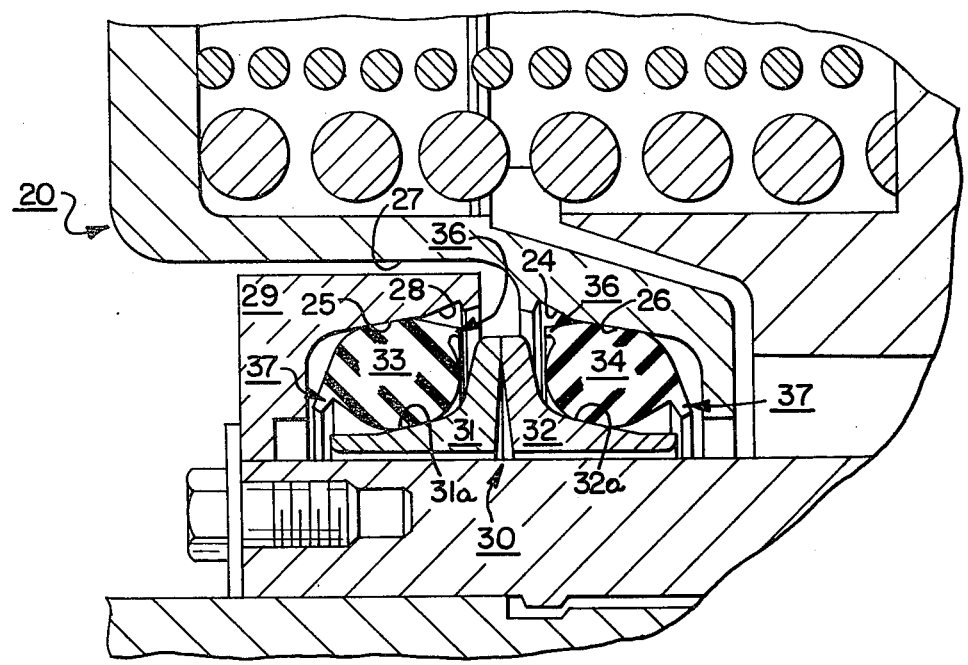
FIG. 1 is a fragmentary vertical section view of a portion of the seal assembly of the invention, showing the same in a position of use, received within a machine mechanism having sealed parts.
Figure 2:
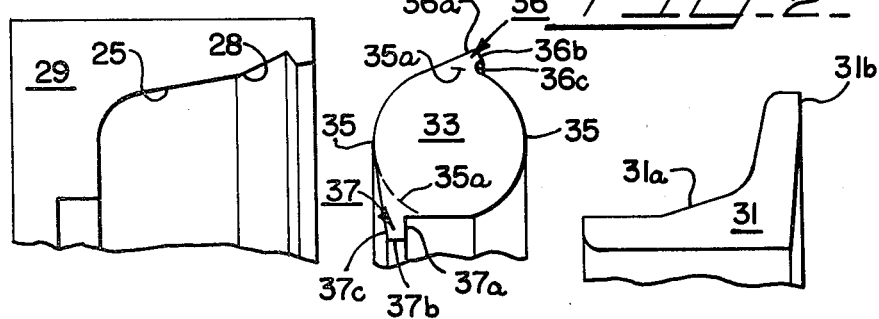
FIG. 2 is an exploded vertical sectional view, on an enlarged scale, showing the principal elements of one portion of the seal assembly of the invention.
Figure 3:
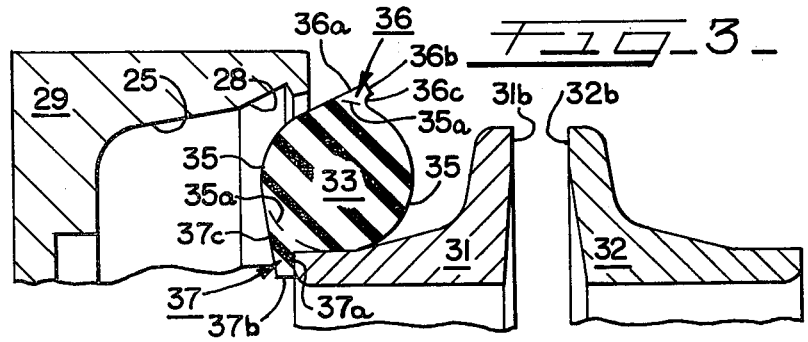
FIG. 3 is a view similar to FIG. 2 but showing two seal parts associated with each other and separated from a third part of the sealed mechanism.

Referring now to the drawings in greater detail, FIG. 1 shows a seal assembly of the invention generally designated 30 in place within a sealed mechanism generally designated 20. The sealed mechanism 20 is, in this case, shown as comprising a large so-called wet disc brake which is an axially-acting multiple disc assembly which includes a large wheel as would be used in an off-the-road truck or grader. Such wet disc brakes use, as a brake system, a plurality of stationary brake plates and a plurality of movable plates, interleaved and splined to the respective associated plates in a manner known to those skilled in the art. These movable plates and their axially directed actuator assemblies are similar, for example, to those used in automotive and motorcycle multiple plate clutch applications.

As shown in FIG. 1, a part of the seal is received in a first counterbore generally designated 24 and shown to include a conical or other tapered surface 26. A second, axially directed counterbore 27 is provided for receiving another part of the seal. According to the invention, the seal is sometimes referred to as a two-piece seal, even though, in most applications, it actually includes four pieces, two each of which are identical to their counterparts, with the assemblies being arranged in a mirror image relation. Thus, referring to FIG. 1, there is shown left and right hand primary seal rings 31 and 32, and left and right hand secondary seal rings 33 and 34.

In the prior art, such as that illustrated in U.S. Pat. No. 3,180,648, and shown in FIG. 14 hereof, the secondary seal members are so-called "0"-rings, that is, they are O-rings of conventional circular cross section which are adapted to roll up and down their tapered exterior surfaces "T" on associated primary seal rings "P", and to be engaged on their outer surfaces by complementary tapered counterbore "C". This rolling action permits axial movement of the primary seal ring P and causes the O-ring O to assume a slightly out of round or flattened "toric" shape. In use, as movement of the sealed part causes the primary seal rings P to move axially with respect to the counterbore C, the respective primary sealing surfaces of the primary seal rings P remain engaged with each other under the axial forces supplied by resistance of the O-ring to axial movement toward the reduced diameter section of the counterbore. The operation of toric O-ring seals of this type is known to those skilled in the art and a further description of their function and operation is not believed necessary to an understanding of the present invention.

Referring now to FIGS. 2-5, the present invention will be shown to reside in modified and improved configuration of the various seal parts, a description of which will now be given with respect to one portion only of a typical seal mechanism, since the other portion is a mirror image thereof.

In keeping with the object of reducing difficulties in installation by insuring correct initial positioning of the O-ring with respect to the primary seal ring and the counterbore, a modified secondary seal ring is provided. This ring or torus includes, in an unbiased or unloaded condition, a central body portion with a circular cross section as illustrated by the combination of solid and dashed lines 35, 35a, respectively and an annular projection or a projecting rib 36 lying on the outer diameter of the circular cross section portion of the seal ring body and terminating in a mounting shoulder having axial and radial surfaces 36a and 36b, and further including a rear axially inwardly facing surface 36c. In addition, the secondary sealing ring also includes, on the generally radially inner portion thereof, a second annular rib 37 which terminates in a generally cylindrical inwardly directed annular mounting surface 37a, a radial surface 37b and a rear axially outwardly facing surface 37c.

The secondary seal ring is mounted on the primary sealing ring 31, 32 which has a tapered surface 31a, customarily present on the structure, and terminates at one end in a radial end face surface 31b which is adapted to abut the radial end face surface 32b of the other primary sealing ring 32 for positive location of the secondary ring 33 with respect to the primary ring 31.

In the past, attempts have been made to use shoulders, etc. on the metal or other rigid portions of a toric O-ring type seal in order to facilitate installation and to make tarting of the O-ring easier and, more importantly, positioning more reliable. One such concept is discussed in U.S. Pat. No. 3,826,506. However, the practical problems associated with starting a toric O-ring in a conical or similar tapered counterbore, while it is positioned on a conical or other tapered seal ring, despite serious effort, have never been solved. In certain instances, such as in very large diameter applications, the difficulty with starting and installing an O-ring and being certain that it is properly positioned once installation has been completed has been so difficult that this otherwise favorable design has been abandoned and substitute designs have been used which offer the advantage of easier and more reliable installation.

While the above example illustrates the difficulty with making proper installations in large diameter applications, such difficulty is not confined to large sizes only. It is thought by many designers, engineers and mechanics, that the major problem with seals is not the difficulty of installation, per se, but the uncertainty of knowing whether the seal has actually been installed correctly. Actual experience in the field has shown that many seals removed for replacement would have had hundreds of hours of remaining useful life except that the O-ring had assumed a tortuous or serpentine path around the seal ring with which it was associated. Such "snaking" causes uneven loading and consequently uneven wear and unreliable dirt exclusion.

In order to prevent the secondary sealing ring or O-ring 33 from assuming a tortuous or serpentine path around the primary seal ring 31, the tangs 36 and 37 are provided. As best shown in the exploded view of FIG. 3, and the assembled view of FIG. 4, which shows the sealing ring 33 in an installed but unloaded condition, installation of the secondary seal rings 33 and 34 on the primary seal rings 31, 32, respectively, can be readily effected by positioning the inwardly directed annular mounting surface 37a against the abutting portion of the primary sealing ring 31, 32 opposite to the radial end face sealing surface 31b, 32b, respectively. The other tang 36 disposed on the outer portion of the secondary sealing rings 33 and 34 is then disposed in a counterbore portion 28 of the retainer 29 and the first counterbore portion 24, respectively. The outer portion 36a and radial face portion 36b of tang 36 are formed to conform to the surfaces of counterbores 28 and 24, or the counterbores may be formed to conform to the tang 36. In this manner, the secondary seal rings 33 and 34 may be readily installed in a position known to be correct by fixing the relative positions during assembly.

In use, or under loaded conditions, as shown in FIG. 5, the axial movement of the sealing system which occurs in operation will permit the sealing rings 33 and 34 to rotate or function in the manner of a standard O-ring seal in that the circular cross section portion of the seal ring body will roll upon the tapered center section 31a and 32a of the respective primary sealing rings and on the tapered surfaces 25 and 26 of the retainer 29 and the counterbore, respectively.

In this manner, such a sealing system can be readily adapted for use in existing mechanisms to be sealed with no, or a minimum, of modification to the existing structure.

Referring now to FIGS. 6 and 7, there is shown an alternative embodiment of the sealing system in an installed and loaded condition, respectively. In the embodiment disclosed in FIGS. 6 and 7, which function in a manner previously described with reference to FIGS. 1-5, the sealing rings 133 and 134 have the generally cylindrical inwardly directed annular tang 137 formed in a modified configuration. In this embodiment, the two primary sealing rings 131 and 132 are each formed with a constant diameter cylindrical portion 131b and 132b, respectively, shoulder portions 131c, 132c and tapered surfaces 131a, 132a. The cylindrical portions 131b and 132b receive the axially extending lower radial inner surface 137b of the two secondary sealing rings and the shoulder portions are engaged by the inward face surface 137a. The axially extending radial surface 137b of the respective sealing rings and the tang 36 enables the secondary seals to be properly installed and insures that the secondary sealing ring has not assumed an improper serpentine or tortuous configuration when this embodiment is submitted to an operational load. As illustrated in FIG. 7, the circular cross section portion of the sealing ring body may move on the tapered or complementary frusto-conical surfaces 131a and 132a between which the secondary sealing rings are positioned, in a manner the same as a standard O-ring secondary seal, due to the substantially circular cross section of the load operative portion of each ring, which is defined as the portion of the seal ring which rolls or the tapered surfaces when the primary seal ring is subjected to axial movement under loading conditions.

Referring now to FIG. 8, there is shown the secondary sealing rings 133 and 134 of FIGS. 6 and 7 mounted on the primary sealing rings 131 and 132. However, in this embodiment both the first counterbore 124 and the counterbore 128 of the retainer 125 has been formed in a slightly modified configuration. In this embodiment, with the secondary sealing rings herein, the axial and radial surfaces 36a and 36b, respectively, of the tang 36 are used in a mechanism wherein the counterbores are not formed to create an exact complementary configuration, the sealing rings 133 and 134 may still be correctly positioned with assurance by use of the annular mounting surface 137a of tang 137. The respective cylindrical portions 131b and 132b of the two primary seal rings 131 and 132, respectively, will achieve this objective. Similar to the embodiments heretofore discussed, the circular cross section of the load operative portion of the seal ring body will permit the rings 133, 134 to act in the manner of a conventional O-ring when assembled and being acted upon by a typical sealing load.

Referring to the embodiments disclosed in FIGS. 9 and 10, the retainer 129 is formed in a manner previously described in FIG. 8. In FIG. 9, the tang 136 is formed with axial and radial surfaces 136a and 136b, respectively, formed to conform with the counterbore 128 formed in the retainer 129. The opposed counterbore and associated sealing rings, not shown, form a mirror image of the configuration of this embodiment. The primary sealing ring 231 is formed with a cylindrical shoulder portion similar to that of the embodiment of primary sealing ring 131, 132, but extending a shorter distance in the axial direction. In addition, in the application illustrated by FIG. 9, the primary sealing ring 231 has a greater ramp configuration 231b which extends upwardly in an inwardly directed axial direction from the cylindrical portion to the tapered surface 231a. In this embodiment, the mating of a tang portion 136 and 237 with their associated bores and shoulders formed on the retainer 129 and the primary seal 231, respectively, allow an assured positioning of the secondary sealing ring 233 within the sealed apparatus and permit the sealing ring 233 to function as a standard or ordinary O-ring by rolling on its curved surfaces when the seal is subjected to a sealing load.

Referring to the embodiment shown in FIG. 10, the retainer 129 is formed in a manner previously described with reference to FIGS. 8 and 9. In this embodiment, the sealing rings, only one of which, 333, is shown, are formed with both the tang 236 and 337 in a further modified configuration. The tang 236 is formed such that its axial and radial surfaces 236a and 236b, respectively, conform to the bore 128 formed in the retainer 129. In effecting such conformity, the axially inwardly facing surface 236c becomes greater than the embodiments previously disclosed with reference to FIGS. 1-5, but the circular cross section portion of the seal ring body is maintained throughout its load operative portion. The second tang 337 is formed with two converging ramp portions and, thereby, has no axially abutting mounting surface which functions as an abutment against the primary sealing ring 331. In this embodiment, the primary sealing ring 331 has a small cylindrical portion 331b at the end opposite the radial end face surface 31b, and is constructed such that the tapered surface 331a forms a smooth planar joinder with the cylindrical surface 331b. The tang portions 236 and 337 facilitate and insure the correct positioning of the secondary sealing ring 333 on or in the sealed mechanism, but permit the circular cross section portion to function in a manner of a standard O-ring when the sealed mechanism is subjected to a seal loading force.

Referring now to FIG. 11, there is illustrated yet another embodiment of an inboard secondary sealing ring 434 utilizing a tang 36 constructed in the manner previously described. This sealing ring has the inwardly directed annular extending radial surface 437 formed as a flat planar surface for mating with a circular portion of a primary sealing ring which is not shown. In this embodiment, a substantial portion of the body of the sealing ring is formed as a circular cross section throughout the upper half of the sealing ring 434 to permit the sealing ring, under load, to function as a standard O-ring in those applications in which it is used.

Referring now to FIGS. 12 and 13, there is shown another embodiment of the invention which may be substituted for a sealing system such as shown in the prior art illustrated by FIG. 14. In this particular embodiment, the cross section of the secondary sealing ring 533 is elliptical in configuration and has only one tang, 36, formed on the upper portion of the secondary sealing ring 533. The lower tang is omitted and the sealing ring is held in place by the lips formed on the primary sealing ring 631 at each end of the ramp portion 631a.

Referring to the embodiment disclosed in FIGS. 15 and 15a, the primary sealing ring 731 is formed with at least one groove 731b which receives a protuberance 637 which may be formed at periodic intervals about the inner circumferential surface of the secondary sealing ring 633. The tang 236 formed on the outer radial surface of the secondary sealing ring 633 is formed in a manner previously discussed with reference to the embodiment of FIG. 10 to mate with a suitable retainer 129, not shown in this drawing. The tang 637 is formed as a substantially semi-hemispheric protuberance which extends into the groove or recess 731b formed in the primary seal ring 731 to assist in the positioning of a secondary seal ring 633 thereupon. This embodiment, as in those previously described will function as an ordinary O-ring when subjected to a seal loading force by allowing the circular cross section load operative portion of the sealing ring to roll upon the tapered ramp portion 731a in a known manner.

In FIG. 16, there is illustrated a still further embodiment of the seal assembly utilizing with a primary sealing ring 31 and retainer 29 as previously described with reference to the embodiment illustrated by FIGS. 1-5. In this embodiment, the secondary sealing ring 733 is formed with two annular projections or projecting tangs 36 and 37, lying circumferentially about the outer diameter outside of the circular cross section or load operative portion of the seal ring body, and about the inner diameter outside of the circular cross section or load operative portion of the seal ring body, respectively. In this embodiment, an axially extending flat portion 735 is formed on the inner diameter of the secondary sealing ring 733, extending inwardly from adjacent to the inwardly directed annular mounting surface 37a parallel to the circular outboard end portion of the primary sealing ring 31 and equidistant thereto. A second flat portion 735a abuts the first surface 735, and the plane of which this portion lies extends from the surface 735 at an angle which corresponds substantially to that of the ramp portion or tapered surface 31a of the primary sealing ring 31. In this manner when the seal is installed positioning will be insured and when the seal is acted upon by a typical sealing load, sealing during axial movement will be facilitated by the mating relationship between the surfaces 735 and 735a and the circular and tapered surfaces, respectively, of the primary sealing ring 31.

Another embodiment of a secondary sealing ring 834 is shown in FIG. 17. In this embodiment, an annular projection or projecting tang 36 is formed circumferentially about the outer diameter of the secondary sealing ring 834 in a manner previously described. The inner diameter of the secondary sealing ring 834 is formed with a flattened portion which extends parallel to the outboard circular portion of the primary sealing ring 31, and an inclined ramp portion 837c, which corresponds and is formed in the manner previously described with reference to the secondary sealing ring 733, is formed in order to insure correct positioning of the seal 834 upon the tapered surface 31a of the primary sealing ring 31. As may be seen in FIG. 17, this embodiment of the secondary sealing ring 834 does not have a second annular inwardly radially projecting tang 37 formed on the inner diameter, but the positioning of the secondary sealing ring 834 onto the primary sealing ring in a correct orientation is insured by the flat portion 837b and the ramp portion 837c meeting with the mating complementary surfaces in the manner previously described with the embodiment disclosed with reference to FIG. 16.

According to the invention, it is also possible to make the castings which form the metal portions of the seal in a simplified manner. Thus, whereas prior art castings often had undercuts for reset portions necessitating the use of special molding techniques, castings useful with the modified rubber ring arrangements of the invention may be made in simple two-piece molds from which the cast products may readily be removed.

While the practice of the invention is not limited to the use of any particular materials, certain materials have been found preferable for use in the various applications in which seals of the present type are most useful. In many applications, the elastomeric secondary seal ring is made from a nitrile ("Buna N") rubber. This material provides good resistance to abrasion, oxidation and oil. Other elastomers are also suitable, depending upon the application, including modified nitriles and other rubber materials which provide abrasion resistance and which are relatively resistant to compression set. Still further elastomers include hydrin rubbers, fluorocarbon rubbers and silicone and fluorosilicone rubbers. The rings may be formed by known methods including compression molding, injection molding or transfer molding.

The primary seal rings are often made from special alloys which are highly abrasion resistant, and which may receive on their end faces a highly polished, honed or lapped finish for use in severe environments. In these applications, alloys such as "Stellite", "Hastelloy-X" or like materials may be preferred. Other suitable ferrous alloys include those containing relatively high percentages of nickel, chromium, vanadium, and cobalt. Other special purpose alloys include those described and claimed in U.S. Pat. No. 4,094,514. Still further, other known steel materials such as tool steel, stainless steel and even ordinary carbon steel may be suitable for some applications. In other cases, the primary ring may be made from one or more reinforced or filled synthetic resins which will provide a relatively stiff cross section. The end face may include a special wear element, and where the primary ring is unable to withstand high radial compressive loads, the primary ring may be supported against radial compression by integral or associated support flanges, spacers, or the like. In many cases, use of these latter materials is adequate where cost savings are important, although it is anticipated that ease and reliability of installation may be most often required where the primary seal ring is relatively large and is made from high cost materials. Thus, the invention does not depend for its operation on the exact selection of materials, but is applicable to a variety of materials known by those skilled in the art to be suitable for use in mechanical end face seals.

While the magnitudes of forces involved in installing seals of the invention, and in the use thereof, vary considerably depending upon the size and shapes of the seals, as used herein and in the claims, the expressions, "initial positioning", "installing", and expressions of similar import will be understood to refer to those positions and operations wherein the parts of the seal are assembled to each other and their associated counterbores, etc. before the portions of the seal mechanism are moved into their final positions of use. In other words, according to the invention, certain forces of relatively low magnitude are provided to insure that there will not be undesired movement between the primary ring, the secondary ring and the counterbore, with these forces being of generally lower magnitude and operatively unrelated to the forces applied to the seal in use thereof. These latter forces are the forces necessary to achieve primary sealing (between relatively rotatable parts) and secondary sealing (between relatively non-rotatable parts) in the use of the seal. The relative amounts of force required to move this seal from an initial installation position to a position of use vary considerably and may be selected by the designer so as best to insure reliable installation.

Preferred embodiments of the invention having been described by way of example, it is anticipated that variations and modifications of the embodiments referred to herein will be apparent to those skilled in the art and that such modifications and changes may be made without departing from the spirit of the invention or the scope of the appended claims.

We claim:

1. A mechanical end face seal assembly comprising, in combination, a rigid, abrasion-resistant primary seal ring and an elastomeric, abrasion-resistant secondary seal ring, said primary seal ring being an annular ring having a body which includes first and second axial end face portions and a generally radially inwardly directed, axially extending annular surface portion joining said end portions at their respective inner diameters, a portion of one of said end faces being finished so as to provide, in cooperation with a mating ring, a primary seal band area, said primary ring further including a radially outwardly directed annular surface having a tapered portion with the larger diameter portion lying closer to said end face having said seal band area thereon, and including a substantially cylindrical portion lying opposite said end face having said sealing band area thereon, said secondary seal ring being of an annular configuration and having a body with a body center section of substantially circular cross section and including an outer surface adapted in use to roll up and down said tapered surface of said primary seal ring to provide an axial sealing load for said primary ring, said secondary ring further including a substantially cylindrical axial portion formed on an inner diameter thereof and extending axially a distance substantially equal to said substantially cylindrical portion of said primary sealing ring for positioning said secondary seal ring thereon and further including at least one annular positioning rib lying outside said body center section, with said rib including a radially inwardly directed, axially facing shoulder surface adapted to engage said primary ring end face surface opposite said seal band surface in abutting relation to prevent axial movement of said secondary seal ring relative to said primary seal ring during installation of said seal assembly.

2. An end face seal as defined in claim 1 wherein said annular positioning rib comprises a cylindrical surface lying outside the area of said body center section of said secondary ring and a shoulder surface extending at least partly radially inwardly to meet an outer surface of said body center section.

3. An end face seal as defined in claim 2 wherein said annular positioning rib includes radially inner and outer surface portions connected by a third annular surface, said radially outer surface portion extending away from said body center section at a tangent thereto.

4. A mechanical end face seal assembly comprising in combination, a rigid, abrasion-resistant primary seal ring and an elastomeric, abrasion-resistant secondary seal ring, said primary seal ring being an annular ring having a body which includes first and second axial end face portions and a generally radially inwardly directed, axially extending annular surface portion joining said end portions at their respective inner diameters, a portion of one of said end faces being finished so as to provide, in cooperation with a mating ring a primary seal band area, said primary ring further including a radially outwardly directed annular surface having a tapered portion with the larger diameter portion lying closer to said end face having said seal band area thereon and including a substantially cylindrical portion lying opposite said end face having said sealing band area thereon, said secondary seal ring being of an annular configuration and having a body with a body center section of substantially circular cross section and including an outer surface adapted and used to roll up and down said tapered surface of said primary seal ring to provide an axial sealing load for said primary ring, said secondary ring further including a substantially cylindrical axial portion formed on an inner diameter thereof and extending axially a distance substantially equal to said substantially cylindrical portion of said primary seal ring for positioning said secondary seal ring thereon and further including wherein said substantially cylindrical surface on said primary seal ring and said tapered surface portion are joined to each other by a substantially radially extending shoulder portion, and said secondary ring further including a counterpart radial surface adapted to engage said primary ring shoulder surface in abutting relation to prevent axial movement of said secondary seal ring relative to said primary seal ring during installation of said seal assembly.

5. An improved secondary seal ring for use in a mechanical end face seal which includes a primary seal ring adapted to be received in position of use within a working environment by said secondary seal ring, and to move axially in use while supported by said secondary seal ring, said secondary seal ring being an annular body which includes a body center section of substantially circular cross section adapted to position said primary seal ring and to apply an axial end load thereto in use as said primary ring moves axially during use, said ring including a cylindrical mounting surface lying outside said body center section to engage a portion of said primary seal ring with at least a slight interference fit so as to position said ring initially with respect to said secondary ring during installation said ring further including an annular, counterbore-engaging rib formation having radially inner and outer surfaces joined to each other by a connecting surface, said outer surface being joined to and extending outwardly from said body center section at a tangent thereto, and said inner surface meeting said body center section at an acute angle to impart flexibility to said rib and an annular positioning shoulder lying radially inwardly of said body center section, said shoulder being defined in part by an axial end face surface extending substantially radially inwardly from said inner surface of said cylindrical portion, and in part by a generally radially extending surface which joins said body center section portion at a tangent thereto, said secondary seal ring further including a tapered, radially inwardly directed mounting surface joining said cylindrical mounting surface, said tapered surface also lying outside said body center section, whereby said primary seal ring may be engaged and supported by two cooperating surfaces for initial positioning.

6. A secondary seal ring as defined in claim 5 further including a second cylindrical mounting surface offset radially inwardly from said body center section by a substantially radially extending shoulder surface, said shoulder surface being adapted to engage a counterpart shoulder surface on said radially outwardly directed portion of said primary seal ring.

7. A modified elastomeric secondary seal ring for use in a seal assembly having a primary seal ring with a tapering radially outwardly directed surface and adapted to lie, in use, within a tapering inwardly directed counterpart surface on a machine element, and to be positioned, supported, and loaded axially by said secondary seal ring, said secondary seal ring having a body of an annular configuration with a body center section portion of substantially circular cross section, and, lying outside said body center section portion, an annular shoulder portion having, when viewed in cross section, a radially inwardly extending shoulder surface for engaging a counterpart radial end face on said primary ring, a generally axially extending, cylindrical surface adapted to engage a counterpart cylindrical surface on said primary ring, and a third annular surface extending axially outwardly from the radially innermost part of said shoulder surface and then extending generally radially outwardly therefrom so as to meet a radially central portion of said body center section portion at a tangent thereto.

8. A mechanical end face seal assembly comprising, in combination, a first machine part having a generally radially inwardly directed, tapering surface adapted to receive thereon an annular contoured elastomeric secondary seal ring for supporting an annular, rigid primary seal ring, said first machine part tapered surface comprising first and second, axially spaced apart portions, and an annular, rib-receiving groove disposed between and separating first and second surface portions, said second surface portion being situated at the larger end of said tapered surface, said groove having first and second legs meeting to define a generally V-shaped cross section, an annular secondary sealing ring made from an elastomeric material and having a body comprising a body center section and a positioning rib section, said body center section being of circular cross section and said positioning rib section including a radially outer surface extending outwardly from a portion of said body center section at a tangent thereto, a radially inner surface portion and an annular surface portion joining said outer and inner surfaces, with at least one of said surfaces being constructed and arranged so as to lie along one of said legs of said V-shaped groove, and an annular primary seal ring made from a rigid, abrasion resistant material and comprising first and second end faces, one of which is polished so as to provide, when associated with a mating part, a seal band area, a radially inwardly directed, generally axially extending surface joining said end face surfaces at their respective inner diameters, and a radially outwardly directed surface having a tapered portion lying between said end faces, with the larger diameter portion thereof lying toward said end face having said seal band thereon, said tapered portion being adapted to receive said secondary sealing ring thereover, whereby said secondary seal ring may support said primary ring for movement through a limited range of axial positions and may apply an axial end face load to said primary seal ring while accommodating dynamic axial end play movement thereof.

9. A mechanical end face seal assembly comprising in combination, a rigid, abrasion-resistant primary seal ring and an elastomeric, abrasion-resistant secondary seal ring, said primary seal ring being an annular ring having a body which includes first and second axial end face portions and a generally radially inwardly directed, axially extending annular surface portion joining said end portions at their respective inner diameters, a portion of one of said end faces being finished so as to provide, in cooperation with a mating ring a primary seal band area, said primary ring further including a radially outwardly directed annular surface having a tapered portion with the larger diameter portion lying closer to said end face having said seal band area thereon, said primary seal ring including in a portion thereof spaced apart from said end face having said seal band area thereon, at least one notch for receiving a locating formation on said secondary seal ring, said secondary seal ring being of an annular configuration and having a body with a body center section of substantially circular cross section and including an outer surface adapted and used to roll up and down said tapered surface of said primary seal ring to provide an axial sealing load for said primary ring, said secondary seal ring further including a locating formation in the form of a projection extending radially inwardly from said body center section and sized for snug reception within said notch so as to further secure said primary and secondary seal rings relative to each other for installation.

* * * * *